(12) United States Patent
Harman et al.

(10) Patent No.: US 8,510,648 B2
(45) Date of Patent: Aug. 13, 2013

(54) APPLICATION ISOLATION SYSTEM

(75) Inventors: William R. Harman, Tucson, AZ (US); Jonathan Isabelle, Tucson, AZ (US); Michael Riedel, Tucson, AZ (US)

(73) Assignee: Open Text S.A., Luxembourg (LU)

(*) Notice: Subject to any disclaimer, the term of this patent is extended or adjusted under 35 U.S.C. 154(b) by 873 days.

(21) Appl. No.: 12/101,657

(22) Filed: Apr. 11, 2008

(65) Prior Publication Data

US 2008/0256438 A1    Oct. 16, 2008

Related U.S. Application Data

(60) Provisional application No. 60/911,772, filed on Apr. 13, 2007.

(51) Int. Cl.
    *G06F 17/00*    (2006.01)
(52) U.S. Cl.
    USPC .......................... 715/255; 715/239; 715/262
(58) Field of Classification Search
    USPC .................................................. 715/255, 249
    See application file for complete search history.

(56) References Cited

U.S. PATENT DOCUMENTS

| | | | | |
|---|---|---|---|---|
| 5,911,776 | A * | 6/1999 | Guck | 709/217 |
| 6,587,897 | B1 | 7/2003 | Jennings et al. | |
| 6,590,674 | B1 * | 7/2003 | Orton | 358/1.18 |
| 6,892,239 | B1 * | 5/2005 | Kirkeby | 709/226 |
| 6,914,693 | B1 * | 7/2005 | Kirkeby | 358/1.15 |
| 2002/0156808 | A1 * | 10/2002 | Duffy et al. | 707/505 |
| 2002/0194228 | A1 | 12/2002 | Reich et al. | |
| 2003/0084443 | A1 * | 5/2003 | Laughlin et al. | 725/39 |
| 2003/0164986 | A1 * | 9/2003 | Boire-Lavigne et al. | 358/400 |
| 2004/0158655 | A1 * | 8/2004 | Kremer | 710/8 |
| 2004/0172586 | A1 * | 9/2004 | Ragnet et al. | 715/500 |
| 2004/0179231 | A1 * | 9/2004 | Savino et al. | 358/1.15 |
| 2004/0225884 | A1 * | 11/2004 | Lorenzini et al. | 713/176 |
| 2005/0091640 | A1 | 4/2005 | McCollum et al. | |
| 2006/0041840 | A1 * | 2/2006 | Blair et al. | 715/513 |
| 2006/0232814 | A1 * | 10/2006 | Shao et al. | 358/1.15 |
| 2006/0259586 | A1 * | 11/2006 | Wood et al. | 709/219 |
| 2008/0030774 | A1 * | 2/2008 | Webster et al. | 358/1.15 |
| 2008/0133560 | A1 * | 6/2008 | Ferlitsch | 707/101 |

(Continued)

FOREIGN PATENT DOCUMENTS

WO    WO02/093374 A2    11/2002

OTHER PUBLICATIONS

Folder 2 Folder Conversion Server Version 2.42 User's Guide (http://replay.web.archive.org/20050503022400/http://www.stillhq.com/pdfdb/000623/data.pdf available as of May 3, 2005).*

(Continued)

*Primary Examiner* — William Bashore
*Assistant Examiner* — Nathan Shrewsbury
(74) *Attorney, Agent, or Firm* — Sprinkle IP Law Group (57) ABSTRACT

A facility for managing a document conversion environment is described. In various embodiments, the facility includes a native application associated with a native document type and an isolation service. The isolation service determines whether a native application associated with the native document type has started and when it has not started, starts the native application and causes the started native application to load and convert a native document to a common document format, wherein the isolation service starts a single instance of the native application and monitors the single instance of the native application so that it complies with specified a parameter, condition, or setting of operation.

20 Claims, 8 Drawing Sheets

(56) References Cited

U.S. PATENT DOCUMENTS

| | | | |
|---|---|---|---|
| 2008/0218808 A1* | 9/2008 | Van Den Berge | 358/403 |
| 2008/0231886 A1* | 9/2008 | Wehner et al. | 358/1.15 |
| 2008/0263071 A1* | 10/2008 | Ferlitsch et al. | 707/101 |

OTHER PUBLICATIONS

Imagemaker Carrier Grade Document Conversion Toolkit as described in the program's Jan. 2005 Readme.*

Supplementary European Search Report issued in European Patent Application No. 08 745 643.0, mailed Jun. 9, 2010, 8 pages.

Endler, M., "The Design of Sampa High Level Support of Distributed Applications," Services in Distributed and Networked Environments, 1995; Second International Workshop on Whistler, BC, Canada Jun. 5-6, 1995; Los Alamitos, CA, USA, IEEE Comp. Soc Lnkd—DOI:10.1109/SDNE, 1995, pp. 86-92.

International Preliminary Report on Patentability issued in International Patent Application No. PCT/US2008/060082, Oct. 13, 2009, 5 pages.

International Search Report and Written Opinion; International Patent Application No. PCT/US08/60082; Filed Apr. 11, 2008; Applicant: Captaris, Inc.; Mailed on Aug. 18, 2008; 9 pages.

* cited by examiner

APPLICATION ISOLATION SYSTEM

CROSS REFERENCE TO RELATED APPLICATION(S)

This application claims the benefit of U.S. Provisional Patent Application No. 60/911,772 filed on Apr. 13, 2007, entitled "APPLICATION ISOLATION SYSTEM," which is incorporated herein by reference in its entirety.

BACKGROUND

Server software is sometimes used for document conversions. As an example, a RightFax server that was commercialized by the assignee of the present patent application converted documents from a native document format to a facsimile document format. A native document format is a document format that is associated with an application ("native application"). Examples of native document formats and corresponding native applications are DOC files and Microsoft® Word®, Workbooks and Microsoft® Excel®, hypertext markup language documents and an Internet browser, and so forth.

Some of these native applications supported an interface called automation, which is also known as object linking and embedding ("OLE") automation. The server software could command these applications using their OLE automation interfaces to open a document and print the document. When printing the document, a printer driver can be specified, such as to print the document in a common document format. Examples of common document formats include Adobe® Portable Document Format, Hewlett Packard® Printer Control Language, facsimile or Tagged Image File Format ("TIFF"), and Adobe® PostScript®. Using the RightFax server, for example, a user could provide a native document format file for sending via facsimile. The RightFax server would receive the document, employ the native application to convert the document to a TIFF common document format, and send the converted TIFF formatted document via facsimile services.

Document conversion server software, such as the RightFax server, is designed to function in high-volume or high-use environments, and can receive and convert many documents from many users. When the server software receives multiple documents, it conventionally would create multiple instances of the automated native application to convert several documents concurrently. However, the native applications are generally designed for use by a single user at a time. When multiple instances of the native applications are launched concurrently, they sometimes behave unexpectedly, such as by freezing or crashing (e.g., because of memory leaks, prompts for user input, and so forth). Oftentimes, the native applications would freeze or crash for various unknown reasons. When this occurs, the document conversion server software can also freeze or crash, such as when the document conversion server software and the native application operate in the same process space.

Other technology exists for converting documents from a native document format to a common document format. The document conversion server software could employ this technology. However, this technology commonly does not support all features of the native applications and so the resulting conversion often does not provide adequate fidelity. As an example, when this technology receives a Word® document containing an embedded Microsoft® Excel® chart or spreadsheet, the technology may not produce output that is similar to what the native application (e.g., Microsoft® Word® in this case) would produce.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

A. Overview

An application isolation system is described. In various embodiments, the application isolation system isolates native applications from a document conversion server software ("server software") so that the server software is unaffected by problems experienced by the native applications. The application isolation system can employ queues to facilitate document conversion, such as queues for incoming native documents and outgoing converted documents. The application isolation system can employ a queue for enqueuing native documents for conversion. In various embodiments, the application isolation system may employ one queue per native document type or one queue for all native document types. A user can employ an application, such as a facsimile client application or simply a file browser, to enqueue native documents for converting. As an example, the user may employ a file explorer to copy a native document into a folder associated with documents enqueued for conversion and sending via facsimile. The application isolation system may also employ one or more queues for holding converted documents. As examples, the application isolation system can employ a queue for various common document types, such as facsimile or TIFF.

When the application isolation system detects that a native document is ready for conversion, it can check whether a corresponding native application has been started. If it has not already started, the application isolation system can start a native application that is capable of handling the enqueued native document. The application isolation system can then provide the enqueued native documents to the native application it starts for conversion. In some embodiments, the application isolation system can provide the enqueued native documents to the native application one at a time. In other embodiments, the application isolation system can provide the enqueued documents to the native application concurrently. By first checking whether the native application has already started, the application isolation system can ensure that one instance of the native application executes.

In various embodiments, the started native applications can execute within a process space identified by the application isolation system. As an example, the application isolation system can be a service, such as a Windows® NT® service ("NT service"). The NT service can start the native application. In various embodiments, the NT service may start multiple native applications, such as one for each native document type that is to be converted. In various embodiments, the started native applications may execute in separate process spaces or may execute within a single process space. The application isolation system can then command the native applications, such as by employing an automation interface or other application programming interface ("API") the native applications provide. As an example, the application isolation system can command a native application to open an enqueued document and print it using a printer driver associated with a specified common document format. When the native application employs a specified printer driver, the printer driver can receive printing commands from the native application and produce an output, such as in TIFF or other common document format.

In various embodiments, the application isolation system can use other mechanisms for converting files. As examples, the application isolation system can print a native document to a file, store a converted file in memory for viewing, convert a native document to a format that can be used by another application, and so forth.

The application isolation system can monitor each native application and print request to ensure that the native application is functioning as expected. A user, e.g., an administrator, can provide various configuration parameters, conditions, or settings to the application isolation system, such as to allocate a specified amount of memory, identify a maximum time for conversion, specify a maximum number of attempts at document conversion, and so forth. These parameters, conditions, and settings can together be referred to herein as simply "parameters." The application isolation system can monitor or enforce these parameters. As an example, the application isolation system can allocate the specified amount of memory to native applications it starts. When a process associated with a native application requests additional memory, such as by allocating more memory using an operating system's memory allocation API, the application isolation system can restart the native application. As another example, when the application isolation system detects that a native application is taking more time than the identified maximum time to convert a document, it can restart the native application and the document conversion process for that document. By restarting native applications when they take more time than anticipated, the application isolation system can substantially reduce the latency between document conversions that sometimes occur, e.g., when native applications complete processing a native document, and thereby facilitate document conversions in high volume environments. Thus, the application isolation system is able to monitor and manage the conversion and rendering of native documents by native applications. When multiple native documents of different types are converted, the application isolation system can monitor and manage each corresponding native application.

In some embodiments, the application isolation system can tune the maximum time, such as based on measuring time to convert known documents or profiling the application isolation system over time. When a native application indicates that a document cannot be converted, that the converted document has no content, or other circumstances in which the application isolation system detects an error condition, the application isolation system can reattempt document conversion a specified maximum number of times. When the maximum number of attempts is reached, the application isolation system may restart the native application. The application isolation system can detect which conversion process has failed, and thus which native application has failed. The application isolation system can report these and other errors, as well as successful conversions or other operating information, in a log, such as an event log.

The application isolation system may also provide other tunable parameters. As an example, the application isolation system may enable a user to set a maximum file size that can be converted, specify document types that can or cannot be converted, and so forth. The application isolation system may also provide notifications to users, such as via a log, electronic messaging, and so forth.

As previously stated, the application isolation system is an NT service in some embodiments. When the application isolation system fails, the operating system can be configured to restart it automatically. When the application isolation system restarts, it can ensure that the conversion process is restarted for documents it was in the process of converting when it failed. The application isolation system can store status, such as which native documents are being converted in a persistent storage, e.g., in a registry or flash random access memory, so that it can check the prior status when it restarts after a failure. In some embodiments, the application isolation system can also employ various queues to check status, such as by checking the status of documents in the converted documents queue.

By configuring, monitoring, and automatically administering the conversion process using single instances of native applications, the application isolation system causes the document conversion server software to be more robust and reliable. As an example, the application isolation system can terminate and restart a native application that appears to be causing failures but ignore another native application that does not exhibit problems.

In some embodiments, the application isolation system can be extended to employ native applications in various forms, such as executable applications, dynamic link libraries, intermediate language code, and so forth.

In various embodiments, the application isolation system can employ various third party software, such as native applications (e.g., Microsoft® Word®), queuing technology (e.g., Microsoft® Message Queuing®), operating systems (e.g., Microsoft® Windows®, Apple® Macintosh® Operating System), and so forth.

In various embodiments, the application isolation system can be used to isolate applications or other processes that perform various conversions, such as documents from one type to another, optical character recognition, text-to-speech, speech-to-text, image recognition, and so forth.

In various embodiments, the application isolation system may receive an indication of a user or user group that has provided the native document and can cause the native application to load files corresponding to the user or user group, such as font files, user dictionaries, templates, and so forth. In other embodiments, or when no user or group is specified, the application isolation system may load similar files that are shared by multiple users or user groups.

B. Illustrated Embodiments

The application isolation system will now be described with reference to the figures. Although the figures illustrate some embodiments, one skilled in the art will understand that other embodiments and combinations of the illustrated embodiments are also possible. Some details that one skilled in the art would be presumed to know have been omitted from the figures.

1. System Components

Figure 1:
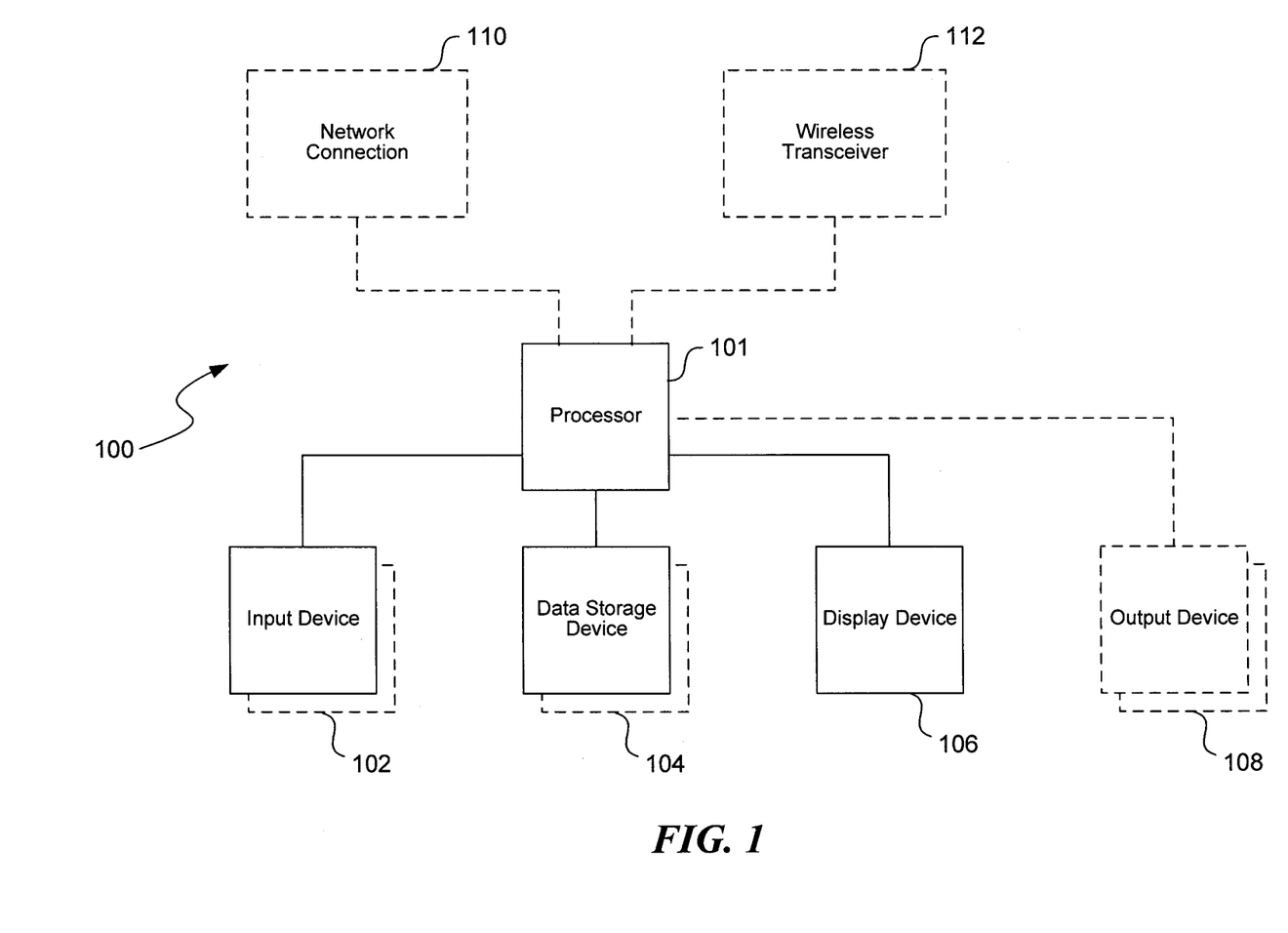
FIG. 1 is a block diagram illustrating a suitable computing environment in which an application isolation system can operate in some embodiments.

FIG. 1 and the following discussion provide a brief, general description of a suitable computing environment in which aspects of the application isolation system can be implemented. Although not required, aspects and embodiments will be described in the general context of computer-executable instructions, such as routines executed by a general-purpose computer, e.g., a server or personal computer. Those skilled in the relevant art will appreciate that the technology can be implemented or practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. The technology can be embodied in a special purpose computer or data processor that is specifically programmed, configured, or constructed to perform one or more of the computer-executable instructions explained in detail below. Indeed, the term "computer", as used generally herein, refers to any of the above devices, as well as any data processor or any device capable of communicating with a network, including consumer electronic goods such as game devices, cameras, or other electronic devices having a processor and other components, e.g., network communications circuitry.

The technology can also be employed in distributed computing environments, where tasks or modules are performed by remote processing devices, which are linked through a communications network, e.g., a Local Area Network ("LAN"), Wide Area Network ("WAN"), or the Internet. In a distributed computing environment, program modules or subroutines may be located in both local and remote memory storage devices. Aspects of the technology described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the technology may reside on a server computer, while corresponding portions reside on a client computer. Data structures and transmission of data particular to aspects of the technology are also encompassed by the technology.

Referring to FIG. 1, an embodiment employs a computer 100, such as a personal computer or workstation, having one or more processors 101 coupled to one or more user input devices 102 and data storage devices 104. The computer can also be coupled to an output device such as a display device 106 or other optional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN), or the Internet (not shown in FIG. 1). Aspects of the technology may be practiced in a variety of other computing environments.

Figure 2:
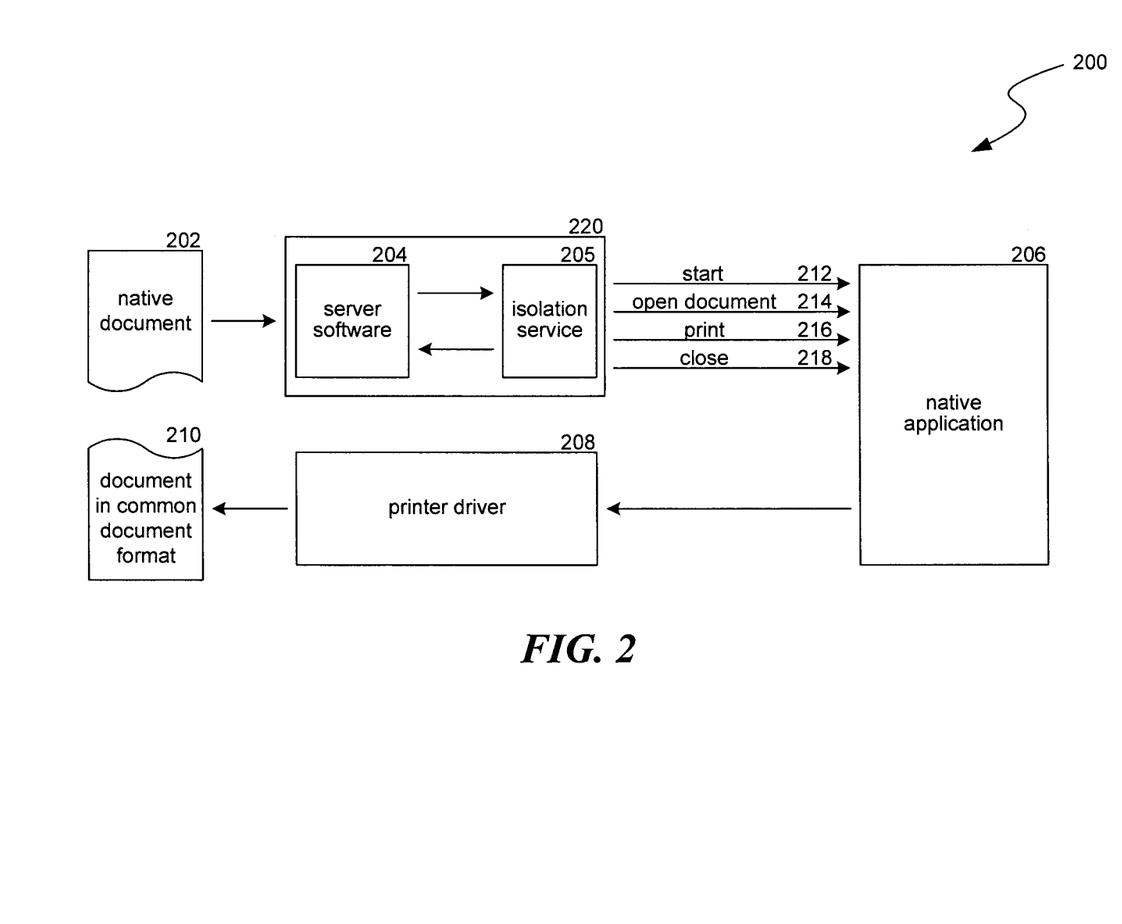
FIG. 2 is a block diagram illustrating components associated with the application isolation system in various embodiments.

FIG. 2 is a block diagram illustrating components associated with the application isolation system 200 in various embodiments. The application isolation system 200 can include a native document 202 that can be converted to other document types. Examples of native document types are Microsoft® Word® documents, Microsoft® Excel® documents, and so forth. A server software 204 can function with other components to convert the native document 202. As an example, the server software 204 can employ an isolation service 205 to convert the document. The isolation service 205 can be an NT service. The isolation service 205 can issue various commands to a native application 206, such as by employing an automation interface or other API provided by the native application 206. As examples, the isolation service 205 can issue start 212, open document 214, print 216, or close 218 commands to the native application 206. The isolation service 205 can issue the start 212 command to start the native application 206, such as when the native application 206 is not already executing. The isolation service 205 can issue the open document 214 command such as when it retrieves a native document from a queue. The isolation service 205 can issue the print 216 command to print the open native document. When the print 216 command is issued, the native application 206 can employ a printer driver 208 to print the document. In some embodiments, the isolation service 205 may specify a printer driver 208 that the native application 206 is to employ. As examples, the isolation service 205 may specify a TIFF printer driver, Printer Control Language ("PCL") printer driver, etc. When the printer driver 208 completes printing, it produces a document 210 in a desired document format or a common document format, such as in TIFF, PCL, or other common document format. The server software 204 and isolation service 205 components may operate at a server computing device 220. The server computing device 220 is described in further detail immediately below in relation to FIG. 3.

Figure 3:
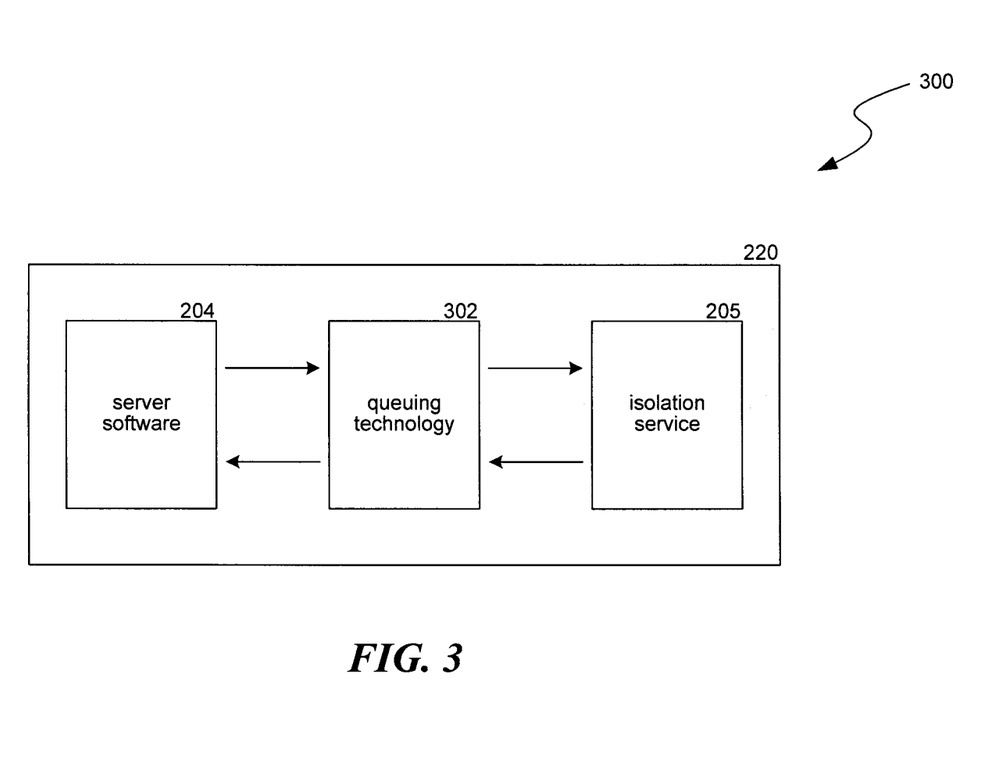
FIG. 3 is a block diagram illustrating additional components associated with the application isolation system in various embodiments.

FIG. 3 is a block diagram illustrating additional components associated with the application isolation system 300 in various embodiments. A server computing device 220 can include server software 204, such as a document conversion server software, and an isolation service 205. The server software 204 and isolation service 205 components were described above in relation to FIG. 2. The server computing device 220 may additionally include queuing technology 302, such as Microsoft® Message Queuing®. The queuing technology provides a facility for software components to enqueue and dequeue messages, documents, or other items.

2. User Interfaces

Figure 4:
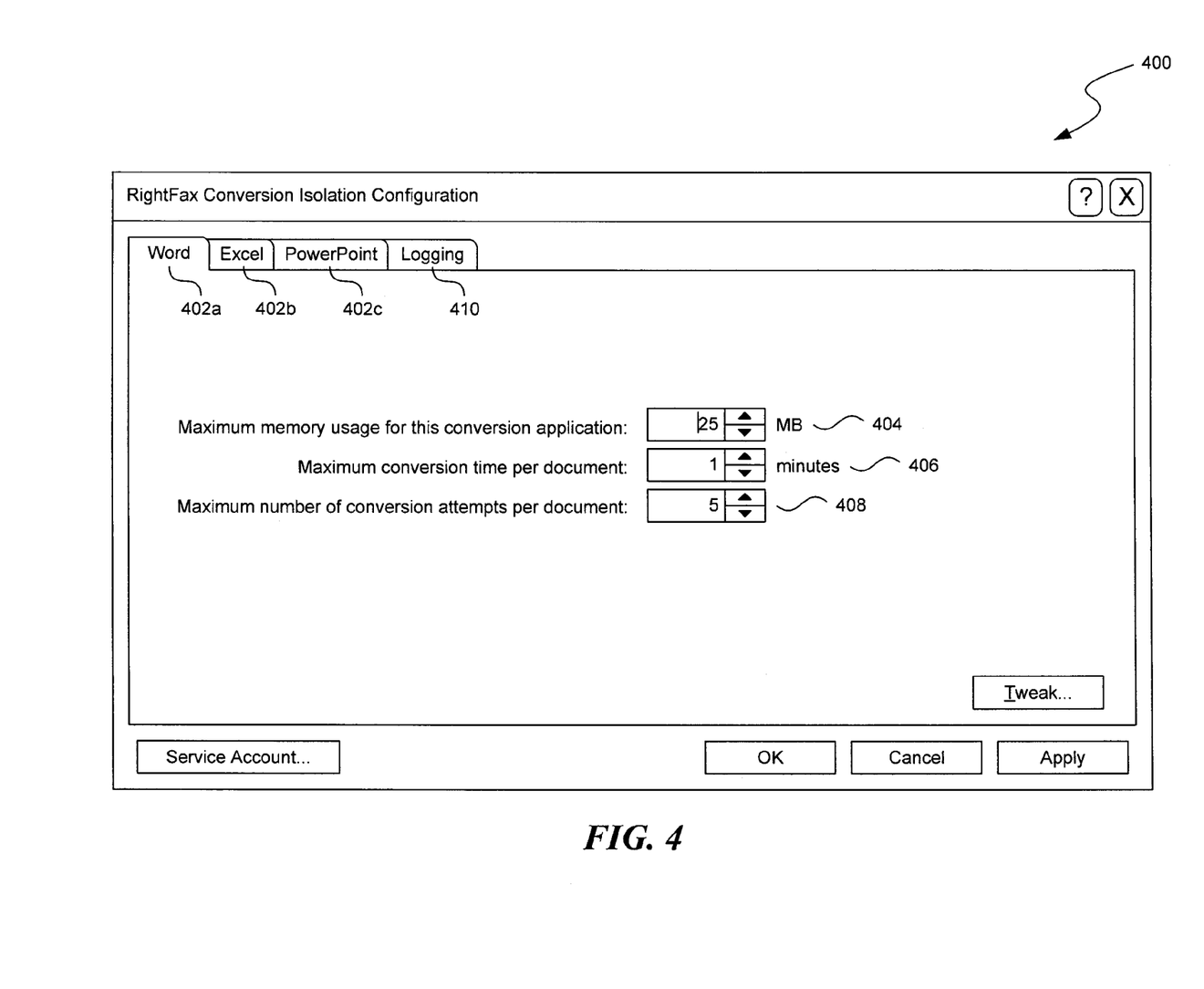
FIGS. 4-5 are user interface diagrams illustrating user interfaces provided by the application isolation system in various embodiments.
Figure 5:
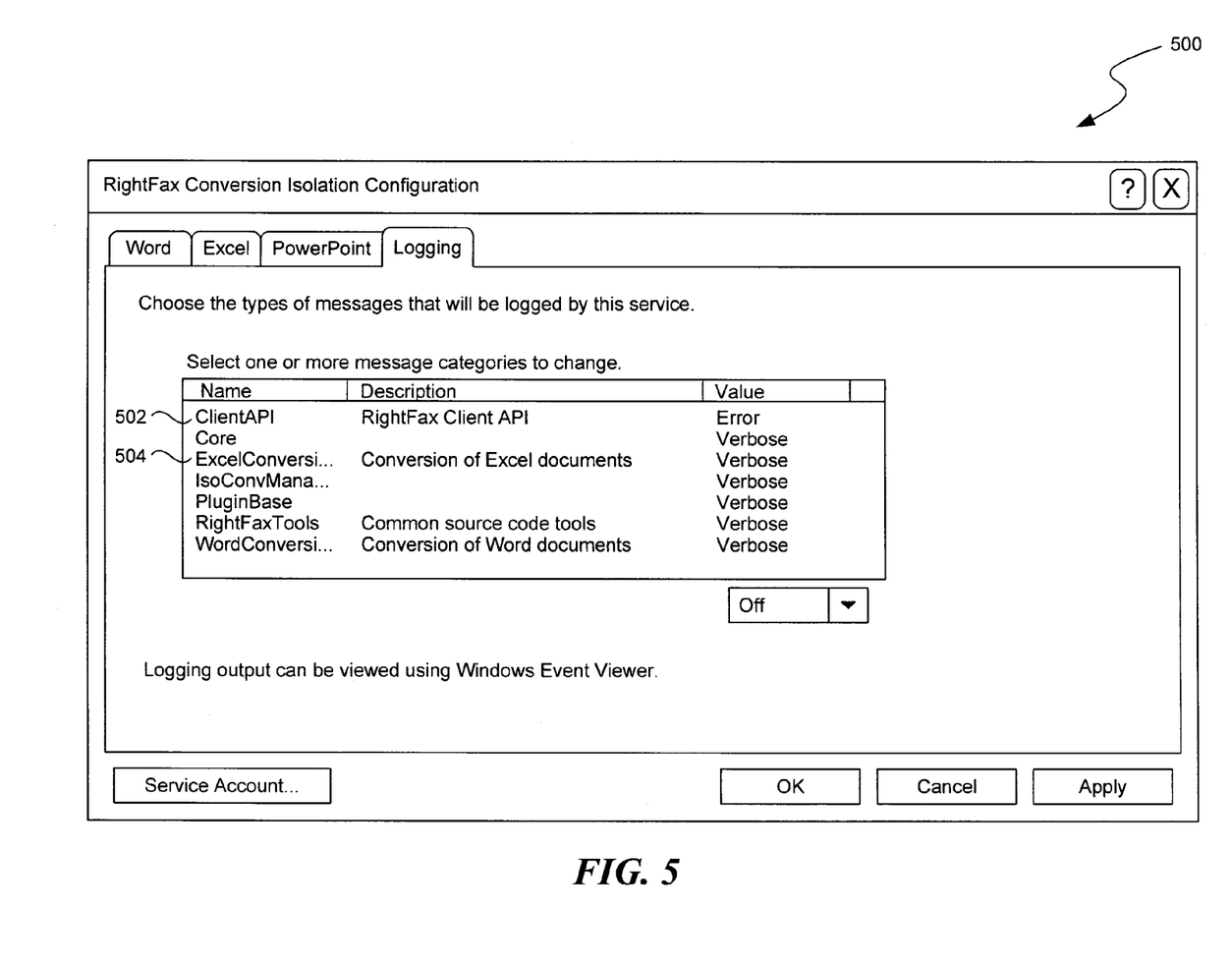

FIGS. 4-5 are user interface diagrams illustrating user interfaces provided by the application isolation system in various embodiments.

FIG. 4 is a user interface diagram illustrating a configuration user interface employed by the application isolation system in some embodiments. The user interface 400 enables a user, such as a system administrator, to configure the application isolation system. The user can specify, for various native applications 402a, 402b, and 402c, maximum memory 404, maximum conversion time 406, maximum conversion attempts 408, and other parameters. The user can specify different parameters for various native applications. The user can also configure or view logging information 410 (described in further detail below in relation to FIG. 5). The user can also specify user accounts that the application isolation system is to use, such as to start native applications, perform logging, and so forth. As an example, a system administrator may identify a limited-use user account so that the application isolation system does not inadvertently provide higher security privileges to a user who provides a document for conversion.

FIG. 5 is a user interface diagram illustrating another configuration user interface employed by the application isolation system in some embodiments. The user interface 500 enables a user to specify the types of messages that the application isolation system will record in a log. As an example, the illustrated embodiment shows that a user has requested the logging of errors relating to a client API 502 and all events relating to conversion of Microsoft® Excel® documents 504.

While some aspects of user interfaces have been illustrated, one skilled in the art would recognize that other user interfaces are also possible.

3. Routines

Figure 6:
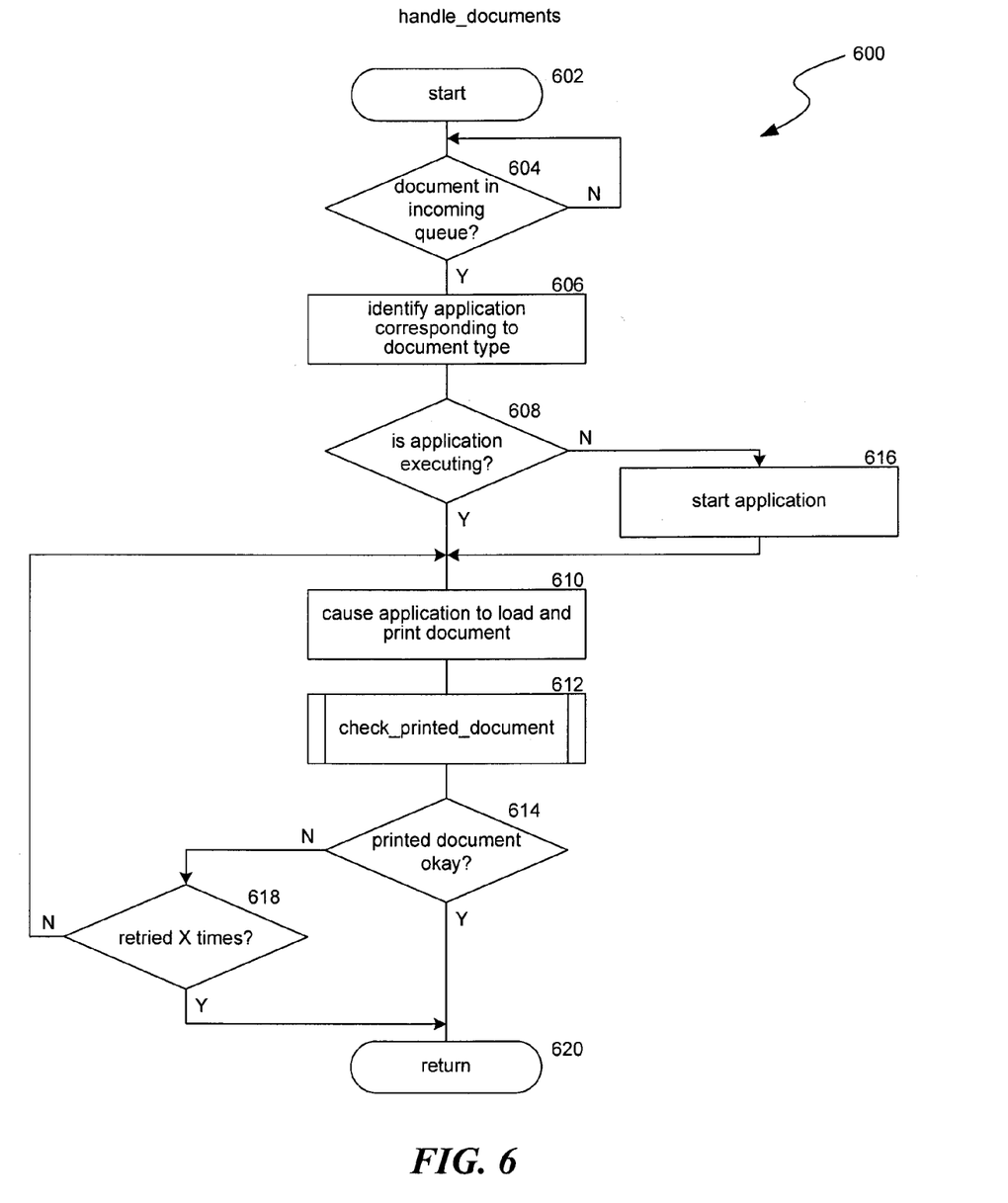
FIG. 6 is a flow diagram illustrating a handle_documents routine invoked by the application isolation system in some embodiments.

FIG. 6 is a flow diagram illustrating a handle_documents routine 600 invoked by the application isolation system in some embodiments. The application isolation system can invoke the handle_documents routine 600 to handle an enqueued document. The handle_documents routine 600 begins at block 602. At decision block 604, the routine determines whether there is a document in an incoming queue. As an example, the routine may check one or more incoming queues associated with native document types. If a document is waiting in a queue, the routine continues at block 606. Otherwise, the routine continues to wait at block 604 for an incoming document.

At block 606, the routine identifies a native application corresponding to the incoming document. In various embodiments, the application isolation system can identify the native application based on the type of the incoming document. The type of the incoming document can be detected based on its filename suffix, document contents, etc.

At decision block 608, the routine determines whether the identified native application is already executing. If the native application is already executing, the routine continues at block 610. Otherwise, the routine continues at block 616, where it starts the identified native application. One skilled in the art would recognize that various error conditions could occur, in which case the application isolation system may need to react accordingly, such as by attempting to restart the native application or return with a failure. The routine then continues at block 610.

At block 610, the routine causes the native application corresponding to the incoming document to load and print the document. The application isolation system can employ an automation interface or other API provided by the native application to load and print the document. In some embodiments, the application isolation system may also specify a printer driver that the native application is to use. As an example, when a user specifies a common document format into which the native document is to be converted, the application isolation system may select a corresponding printer driver.

At block 612, the routine invokes a check_printed_document subroutine to verify whether the native application correctly converted the native document. The check_printed_document subroutine 612 is described in further detail below in relation to FIG. 7.

At decision block 614, the routine determines whether the document printed successfully. If the document printed successfully, the routine returns at block 620. Otherwise, the routine continues at decision block 618.

At decision block 618, the routine determines whether it has already tried to print the native document a specified number of times. The number of times can be specified by a user, such as a system administrator. As an example, the system administrator can specify the number of times to make an attempt using a user interface associated with the application isolation system, e.g., the user interface illustrated in FIG. 4 and described above. If the application isolation system has attempted to print the native document the specified number of times, the routine returns at block 620, where it may return an error. Otherwise, the routine returns at block 610 to retry printing the document.

Figure 7:
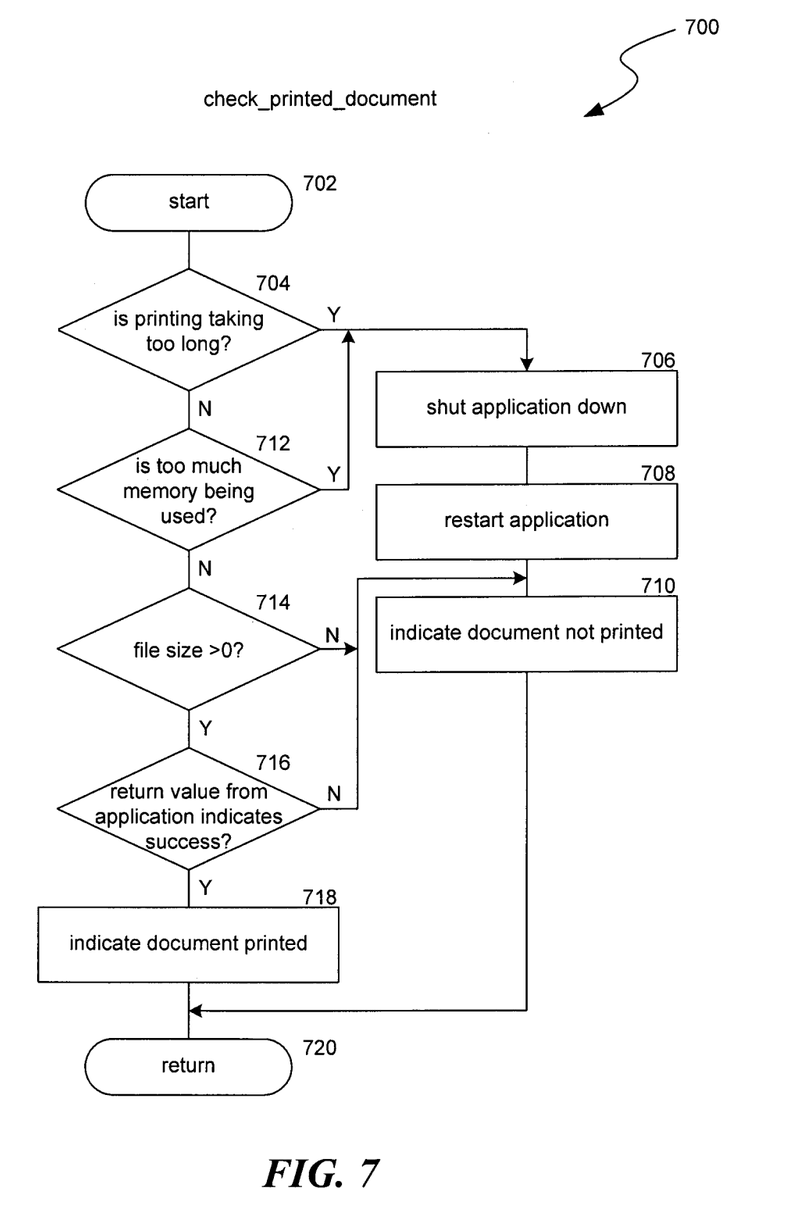
FIG. 7 is a flow diagram illustrating a check_printed_document routine invoked by the application isolation system in some embodiments.

FIG. 7 is a flow diagram illustrating a check_printed_document routine 700 invoked by the application isolation system in some embodiments. The check_printed_document routine 700 may be invoked by the handle_documents routine described above in relation to FIG. 6. The check_printed_document routine 700 begins at block 702.

At decision block 704, the routine determines whether the native application is taking too long to print. As an example, the routine determines whether the time difference between the present time and the time at which the application isolation system requested the native application to begin printing exceeds a threshold amount specified by an administrator or determined by the application isolation system to be a reasonable amount of time, such as based on the document's size. If the native application is taking too long to print the document, the routine continues at block 706. Otherwise, the routine continues at decision block 712.

At block 706, the routine shuts down the application and then attempts to restart the application at block 708. The routine then indicates at block 710 that the document was not printed. The routine then continues at block 720, where it returns.

At decision block 712, the routine determines whether the native application is consuming too much memory. As an example, the routine determines whether the native application has allocated more memory than was specified in a configuration setting associated with the application isolation system. If the native application is consuming too much memory, the routine continues at block 706. Otherwise, the routine continues at decision block 714.

At decision block 714, the routine determines whether the native application printed the document. As an example, the routine can determine whether an output file was printed, the file has more than zero bytes, or whether the file has content. If the native application printed the document, the routine continues at decision block 716. Otherwise, the routine continues at block 710. In some embodiments, the routine may continue at block 706 instead of block 710.

At decision block 716, the routine determines whether a return value from the native application indicates that the native application successfully converted the document. If the return value indicates that the native application successfully converted the document, the routine continues at block 718. Otherwise, the routine continues at block 710. In some embodiments, the routine may continue at block 706 instead of block 710.

At block 718, the routine indicates that the native application successfully printed the document. The routine then continues at block 720, where it returns.

Figure 8:
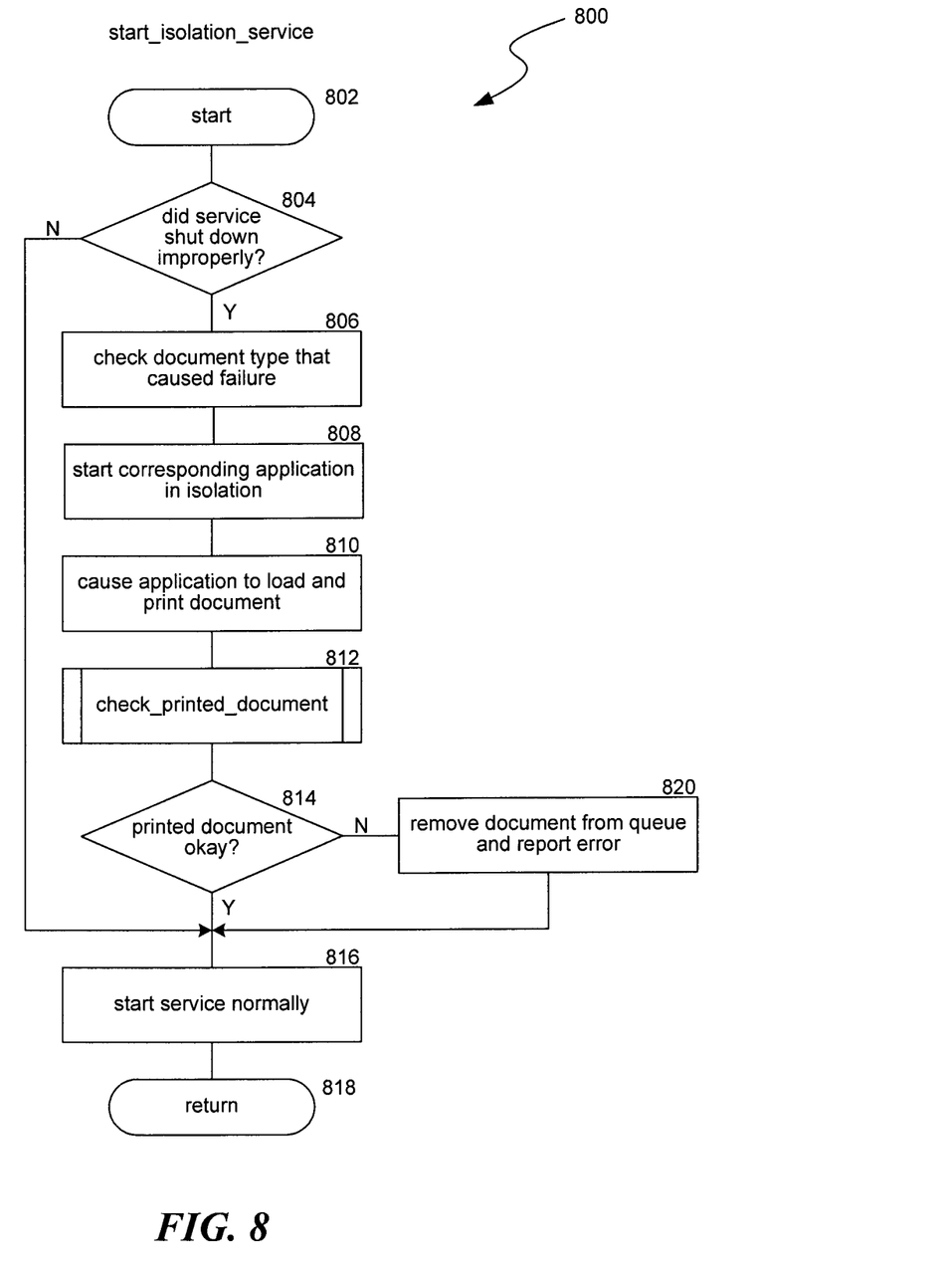
FIG. 8 is a flow diagram illustrating a start_isolation_service routine provided by the application isolation system in some embodiments.

FIG. 8 is a flow diagram illustrating a start_isolation_service routine 800 provided by the application isolation system in some embodiments. An operating system component, such as a service control manager component, may invoke the start_isolation_service routine 800, such as when the operating system for the application isolation system restarts. The routine begins at block 802.

At decision block 804, the routine determines whether the application isolation system previously shut down improperly. As an example, the application isolation system may store an indication in a persistent storage that it previously shut down properly. If the application isolation system previously shut down improperly, the routine continues at block 806. Otherwise, if the application isolation system shut down properly, the routine continues at block 816.

At block 806, the routine checks which document or which document type previously caused the application isolation system to shut down improperly. At block 808, the routine starts the corresponding native application in isolation. In some embodiments, the application isolation system does not start other native applications, even when native documents may be enqueued. At block 810, the routine causes the started native application to load and print the document that previously caused the application isolation system to shut down improperly. At block 812, the routine invokes the check_printed_document subroutine.

At decision block 814, the routine determines whether the document printed successfully. If the document printed successfully, the routine continues at block 816. Otherwise, at block 820, the routine removes the document from the queue and reports an error, such as in a log. The routine then continues at block 816.

At block 816, the routine starts the service normally. The application isolation system then continues to process enqueued native documents. The routine returns at block 818.

Although the illustrated embodiments are described in relation to converting documents using a printing mechanism, other mechanisms can be employed. As an example, the application isolation system can employ features provided by native applications to convert documents. Examples of features include a "Save As" command, "Convert" command, and so forth. Alternatively, the application isolation system may provide additional components for performing the conversion from one document type to another.

In some embodiments, the application isolation service can balance application management versus process speed. For example, a facsimile server application architecture might depend on large volumes of PCL conversion. To use the application isolation service to manage such tasks may require additional processor time for inter-process communication, and also time to serialize tasks for the application isolation service. The application isolation service can be modified to permit parallelization so that it can handle a configurable or dynamically determined number of like tasks at once. This would permit concurrent parallel processing of PCL conversions with the stability and application runtime management benefits of the application isolation service.

In some embodiments, the application isolation system manages a document conversion environment with components comprising a native application associated with a native document type and an isolation service. The isolation service determines whether a native application associated with the native document type has started and when it has not started, starts the native application and causes the started native application to load and convert a native document to a common document format, wherein the isolation service starts a single instance of the native application and monitors the single instance of the native application so that it complies with specified a parameter, condition, or setting of operation.

In some embodiments, the application isolation system performs a method for managing document conversion in a document conversion environment, comprising: determining that a document having a native document type is awaiting to be converted; identifying a native application corresponding to the native document type; determining whether the identified native application is executing; when the identified native application is not executing, starting the native application; commanding the native application to load and convert the document; and monitoring the native application to ensure that it complies with a specified parameter, condition, or setting. In some embodiments, computer-executable instructions to perform this method are stored in a computer-readable storage medium.

C. Conclusion

Various embodiments of the application isolation system are described above. It will be appreciated that the details set forth above are provided to describe the embodiments in a manner sufficient to enable a person skilled in the relevant art to make and use the disclosed embodiments. Several of the details and advantages, however, may not be necessary to practice some embodiments. Additionally, some well-known structures or functions may not be shown or described in detail, so as to avoid unnecessarily obscuring the relevant description of the various embodiments. Although some embodiments may be within the scope of the claims, they may not be described in detail with respect to the Figures. Furthermore, features, structures, or characteristics of various embodiments may be combined in any suitable manner. Moreover, one skilled in the art will recognize that there are a number of other technologies that could be used to perform functions similar to those described above and so the claims should not be limited to the devices or routines described herein. While processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. The headings provided herein are for convenience only and do not interpret the scope or meaning of the claims.

The terminology used in the description is intended to be interpreted in its broadest reasonable manner, even though it is being used in conjunction with a detailed description of identified embodiments.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Aspects of the application isolation system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the application isolation system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the application isolation system reside on various computing devices, such as a server computer, a client computer, and so forth. Thus, while certain hardware platforms are described herein, aspects of the application isolation system are equally applicable to nodes on a network or other types of computing devices.

These and other changes can be made in light of the above Detailed Description. While the above description details certain embodiments and describes the best mode contemplated, no matter how detailed, various changes can be made. Implementation details may vary considerably, while still being encompassed by the application isolation system disclosed herein. As noted above, particular terminology used when describing certain features or aspects of the application isolation system should not be taken to imply that the terminology is being redefined herein to be restricted to any specific characteristics, features, or aspects of the application isolation system with which that terminology is associated. In general, the terms used in the following claims should not be construed to limit the claims to the specific embodiments disclosed in the specification, unless the above Detailed Description section explicitly defines such terms. Accordingly, the actual scope of the claims encompasses not only the disclosed embodiments, but also all equivalents.

We claim:

1. A system for managing a document conversion environment, comprising:
    at least one server computer communicatively connected to one or more devices on a network and running an isolation service, wherein when a document having a native document type is ready for conversion, the isolation service determines whether a native application associated with the native document type is executing and
    when the native application is executing, the isolation service causes the executing native application to load and convert the document from the native document type to a common document format,
    when the native application is not executing, the isolation service executes the native application and causes the executing native application to load and convert the document to the common document format,
    wherein by first determining whether the native application associated with the native document type is already executing prior to causing the native application to load and convert the document to the common document format, the isolation service ensures only a single instance of the native application executes for the conversion,
    wherein the isolation service monitors and manages the conversion of the document by the single instance of the native application according to at least one specified document conversion operation parameter, condition, or setting.

2. The system of claim 1 wherein the isolation service restarts the single instance of the native application when it does not comply with the at least one specified document conversion operation parameter, condition, or setting.

3. A method performed by an application isolation system for managing document conversion in a document conversion environment, the method comprising:
    the application isolation system determining that a document having a native document type is awaiting to be converted, the application isolation system running on a computer communicatively connected to one or more devices on a network;
    the application isolation System identifying a native application corresponding to the native document type;
    the application isolation system determining whether the identified native application is executing;
when the identified native application is executing, the application isolation system commanding the executing native application to load and convert the document;
    when the identified native application is not executing, the application isolation system starting the native application and commanding the started native application to load and convert the document;
    wherein by first determining whether the native application associated with the native document type is already executing prior to causing the native application to load and convert the document, the application isolation system ensures only a single instance of the native application executes for the conversion; and
    the application isolation system monitoring and managing the conversion of the document by the identified native application to according to at least one specified document conversion operation parameter, condition, or setting.

4. The method of claim 3 further comprising restarting the native application when it does not comply with the at least one specified document conversion operation parameter, condition, or setting.

5. The method of claim 3 wherein the commanding the native application to convert the document includes commanding the native application to print the document.

6. The method of claim 3 wherein the commanding the native application to convert the document includes commanding the native application to print the document using a specified printer driver.

7. A non-transitory computer-readable medium storing computer-executable instructions that, when executed by a computer, cause the computer to perform an isolation service including:
    determining that a document having a native document type is awaiting to be converted; identifying a native application corresponding to the native document type; determining whether the identified native application is executing;
    when the identified native application is executing, commanding the executing native application to load and convert the document;

when the identified native application is not executing, starting the native application and commanding the started native application to load and convert the document;

wherein by first determining whether the native application associated with the native document type is already executing prior to causing the native application to load and convert the document, the isolation service ensures only a single instance of the native application executes for the conversion; and monitoring and managing the conversion of the document by the identified native application according to one or more specified document conversion operation parameters, conditions, or settings.

8. The non-transitory computer-readable medium of claim 7, wherein the computer-executable instructions when executed by the computer further cause the computer to perform restarting the native application when it does not comply with the one or more specified document conversion operation parameters, conditions, or settings.

9. The non-transitory computer-readable medium of claim 7, wherein the commanding the native application to convert the document includes commanding the native application to print the document.

10. The non-transitory computer-readable medium of claim 9, wherein the commanding the native application to convert the document includes commanding the native application to print the document using a specified printer driver.

11. The non-transitory computer-readable medium of claim 7, wherein the computer-executable instructions when executed by the computer further cause the computer to perform balancing application management with speed of the native application.

12. The system of claim 1, wherein the at least one specified document conversion operation parameter, condition, or setting comprises an amount of memory allocation and wherein the isolation service running on the at least one server computer is configured to:
    allocate the amount of memory to the native application when the isolation service executes the native application; and
    restart the native application when a process associated with the native application requests additional memory.

13. The system of claim 1, wherein the at least one specified document conversion operation parameter, condition, or setting comprises a maximum time for conversion and wherein the isolation service running on the at least one server computer is configured to:
    detect that the native application is taking more time to convert the document than the maximum time for conversion; and
    restart the native application and a document conversion process for the document.

14. The system of claim 1, wherein the at least one specified document conversion operation parameter, condition, or setting comprises a maximum number of attempts for conversion and wherein the isolation service running on the at least one server computer is configured to:
    detect an error condition in the conversion of the document;
    attempt to perform the conversion until the maximum number of attempts for conversion is reached; and
    when the maximum number of attempts for conversion is reached, restart the native application.

15. The method of claim 3, wherein the at least one specified document conversion operation parameter, condition, or setting comprises an amount of memory allocation, the method further comprising:
    the application isolation system allocating the amount of memory to the native application when the application isolation system starts the native application; and
    the application isolation system restarting the native application when a process associated with the native application requests additional memory.

16. The method of claim 3, wherein the at least one specified document conversion operation parameter, condition, or setting comprises a maximum time for conversion, the method further comprising:
    the application isolation system detecting that the native application is taking more time to convert the document than the maximum time for conversion; and
    the application isolation system restarting the native application and a document conversion process for the document.

17. The method of claim 3, wherein the at least one specified document conversion operation parameter, condition, or setting comprises a maximum number of attempts for conversion, the method further comprising:
    the application isolation system detecting an error condition in the conversion of the document;
    the application isolation system attempting to perform the conversion until the maximum number of attempts for conversion is reached; and
    when the maximum number of attempts for conversion is reached, the application isolation system restarting the native application.

18. The non-transitory computer-readable medium of claim 7, wherein the one or more specified document conversion operation parameters, conditions, or settings comprise an amount of memory allocation and wherein the computer-executable instructions when executed by the computer further cause the computer to perform:
    allocating the amount of memory to the native application when starting the native application; and
    restarting the native application when a process associated with the native application requests additional memory.

19. The non-transitory computer-readable medium of claim 7, wherein the one or more specified document conversion operation parameters, conditions, or settings comprise a maximum time for conversion and wherein the computer-executable instructions when executed by the computer further cause the computer to perform:
    detecting that the native application is taking more time to convert the document than the maximum time for conversion; and
    restarting the native application and a document conversion process for the document.

20. The non-transitory computer-readable medium of claim 7, wherein the one or more specified document conversion operation parameters, conditions, or settings comprise a maximum number of attempts for conversion and wherein the computer-executable instructions when executed by the computer further cause the computer to perform:
    detecting an error condition in the conversion of the document;
    attempting to perform the conversion until the maximum number of attempts for conversion is reached; and
    when the maximum number of attempts for conversion is reached, restarting the native application.

* * * * *

UNITED STATES PATENT AND TRADEMARK OFFICE
CERTIFICATE OF CORRECTION

PATENT NO. : 8,510,648 B2
APPLICATION NO. : 12/101657
DATED : August 13, 2013
INVENTOR(S) : Harman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this
Thirtieth Day of December, 2014

Michelle K. Lee
*Deputy Director of the United States Patent and Trademark Office*